Feb. 2, 1943.  O. STEINER  2,310,165
PHOTOGRAPHIC FLASHLIGHT EQUIPMENT
Original Filed July 19, 1940  5 Sheets-Sheet 1
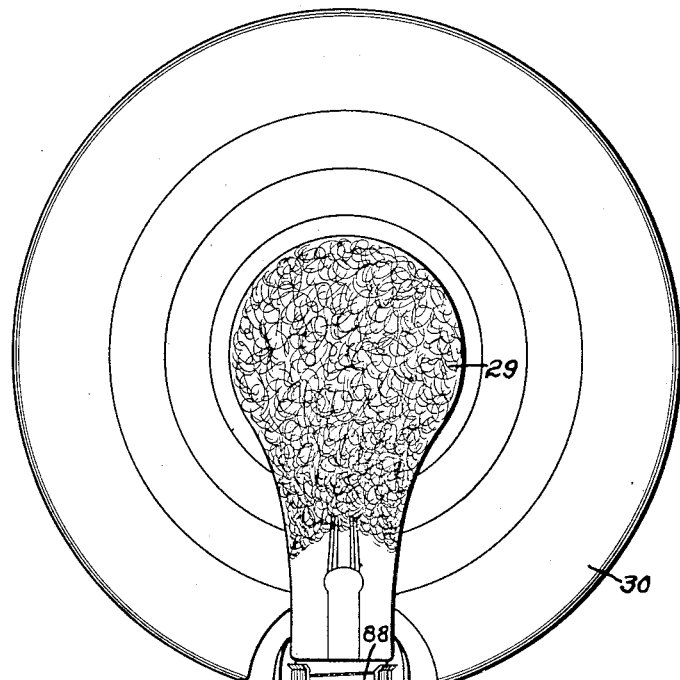
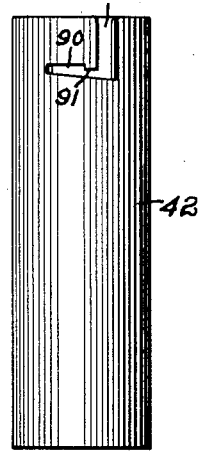
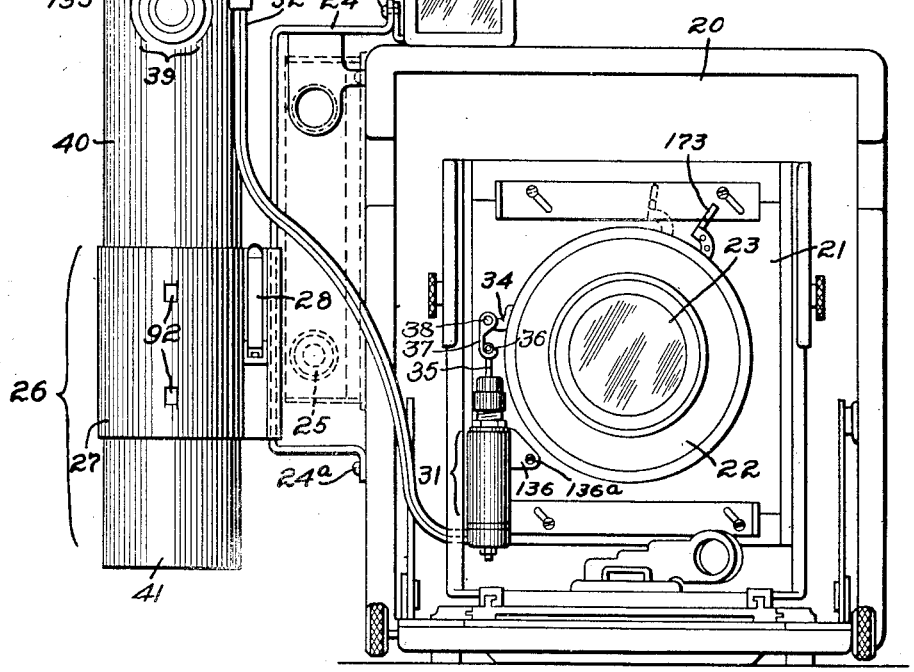
Inventor:
Oscar Steiner,
Attys.

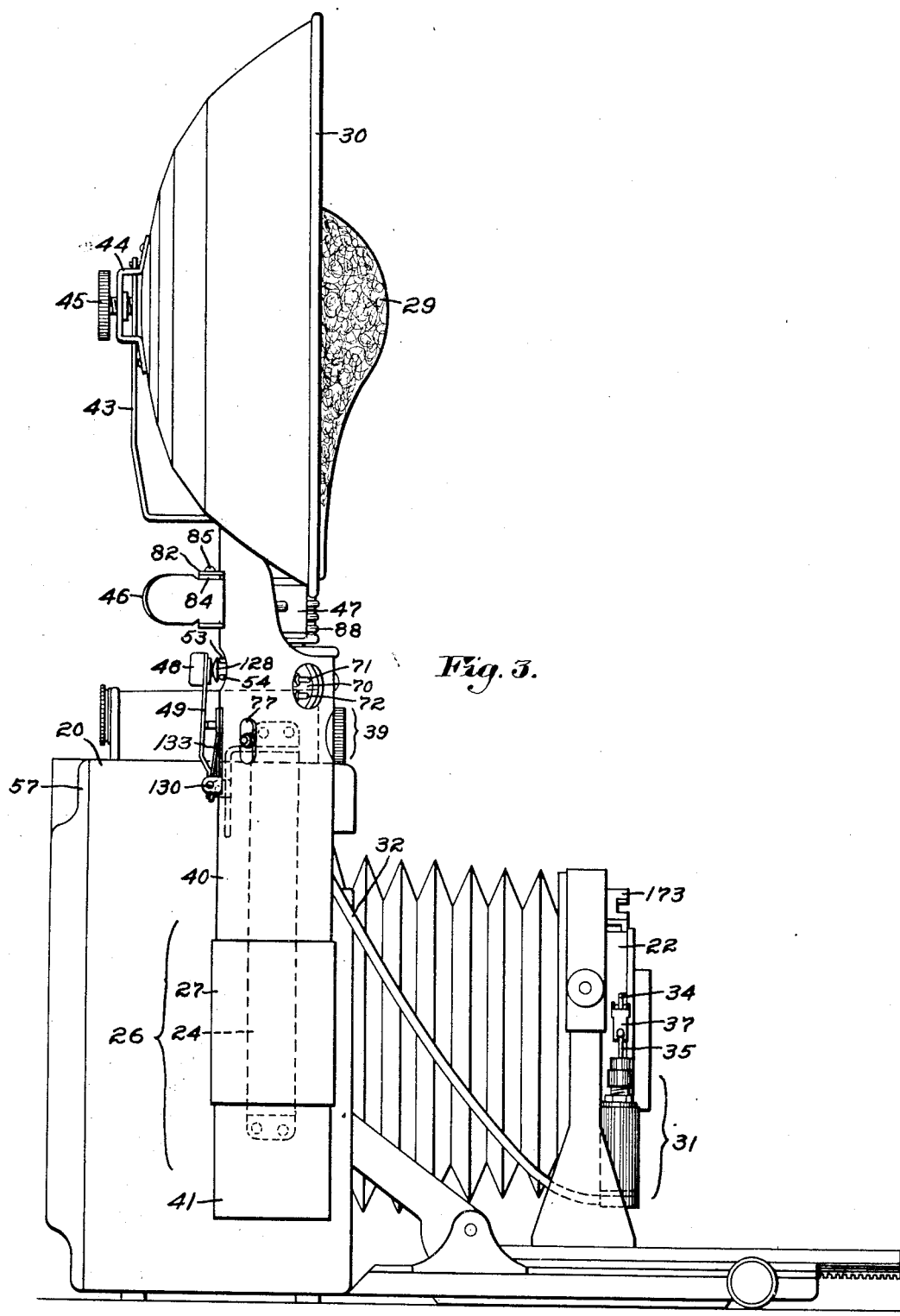

Feb. 2, 1943. O. STEINER 2,310,165
PHOTOGRAPHIC FLASHLIGHT EQUIPMENT
Original Filed July 19, 1940 5 Sheets-Sheet 3

Inventor.
Oscar Steiner,
by Emery, Booth, Townsend, Miller and Kristien
Attys.

Feb. 2, 1943. O. STEINER 2,310,165
PHOTOGRAPHIC FLASHLIGHT EQUIPMENT
Original Filed July 19, 1940 5 Sheets-Sheet 4

Inventor:
Oscar Steiner,
by Emery, Booth, Townsend, Miller and Weidner,
Attys.

Feb. 2, 1943.　　　　　O. STEINER　　　　2,310,165
PHOTOGRAPHIC FLASHLIGHT EQUIPMENT
Original Filed July 19, 1940　　5 Sheets-Sheet 5
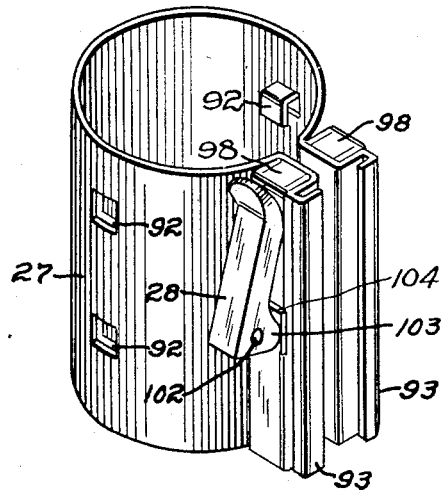
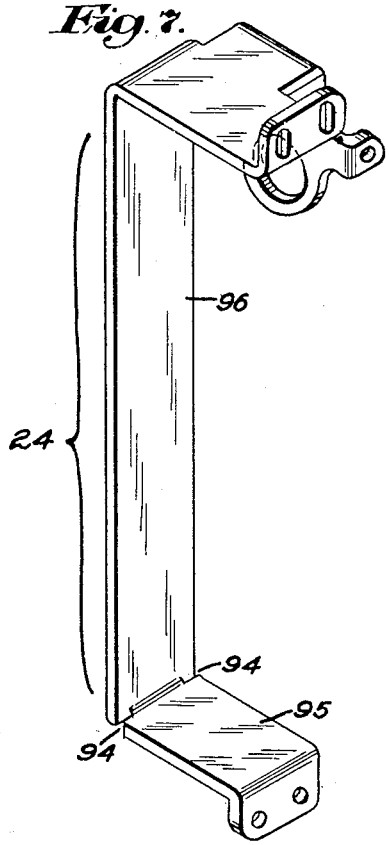
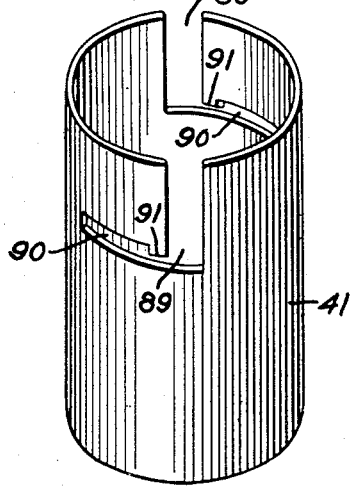
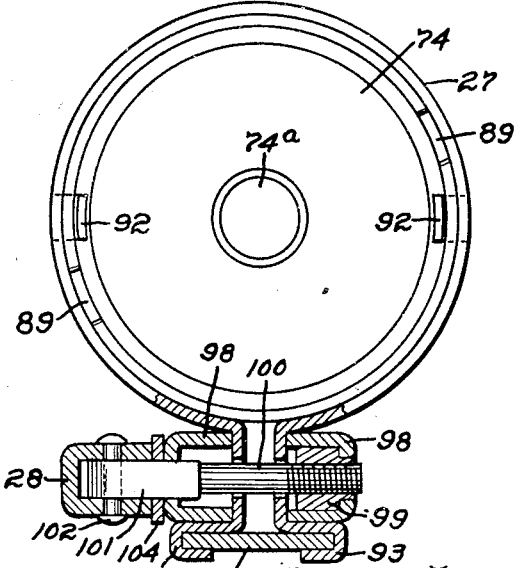
Inventor:
Oscar Steiner, Patented Feb. 2, 1943

2,310,165

UNITED STATES PATENT OFFICE 2,310,165

PHOTOGRAPHIC FLASHLIGHT EQUIPMENT

Oscar Steiner, Irondequoit, N. Y., assignor to The Folmer Graflex Corporation, Rochester, N. Y., a corporation of Delaware Original application July 19, 1940, Serial No. 346,395. Divided and this application April 18, 1941, Serial No. 389,157

12 Claims. (Cl. 67—31)

This application is a division of my co-pending application Ser. No. 346,395, filed July 19, 1940.

This invention relates to photographic flashlight synchronizer equipment.

In order that the principle of the invention may be readily understood, I have disclosed a single embodiment, with several indicated uses thereof, in the accompanying drawings, wherein—

Fig. 1 is a front plan view of a camera having attached thereto a flashlight equipment in accordance with my invention, the battery case being attached to the left hand side of the camera box and the magnetic tripper to the lens board of the camera;

Fig. 2 is a detail of the battery case extending member employed when three cells are used in the battery case;

Fig. 3 is a side view of the camera and equipment showing the battery case on the camera box and the magnetic tripper on the lens board, the camera being open and a bulb in place ready for operation;

Fig. 6 is a detail in perspective, showing the battery case clamping means;

Fig. 7 is a detail in perspective showing the synchronizer battery case mounting bracket;

Fig. 8 is a detail in perspective of the lower part of the battery case, when two cells are used;

Fig. 9 is a top plan view of the lower half of the battery case removed from the upper half, the clamping means being in section;

Figure 4:
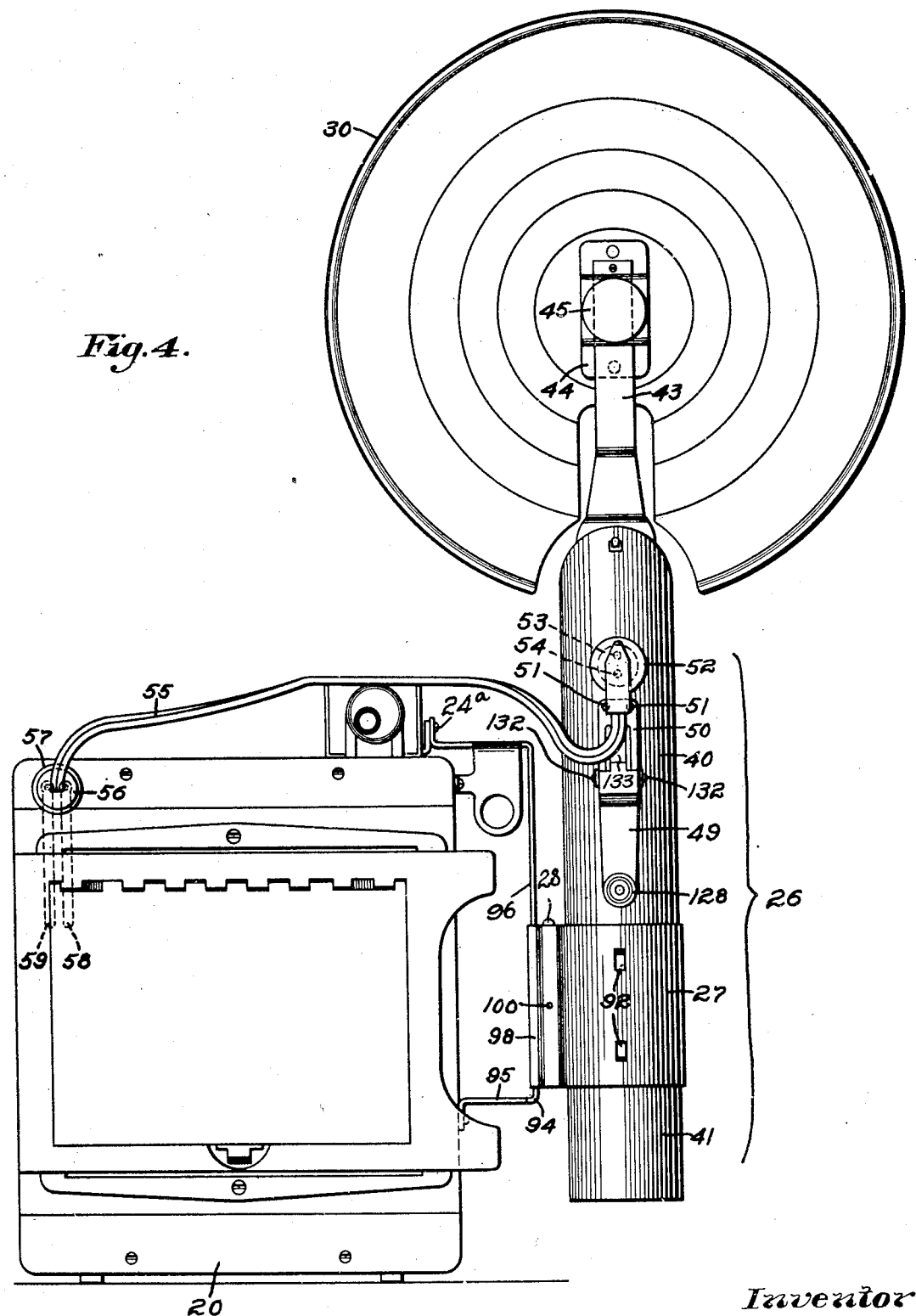
Fig. 4 is a rear view in elevation showing the position of the battery case with respect to the camera and the electrical connecting cable in place for focal plane synchronization.

I am aware that there have been numerous devices produced for the purpose of synchronizing the flashing of a photo-flash lamp with the opening of a photographic shutter, but so far as I am aware they have all been very limited in their scope of operation, have been hard to adjust and the accuracy of such adjustment has been difficult to maintain.

I have by my invention provided a synchronizing equipment that is readily adaptable to all types of camera shutters, both the front or between-the-lens type and the focal-plane shutter type, and such equipment of my invention readily lends itself to precision manufacturing. The parts of the equipment as constructed in accordance with my invention are of great strength and they coordinate effectively in their several adjustments, whatever be the type of camera upon which they are used.

Among the numerous novel features of my invention, I may enumerate the following as of particular importance; a battery case readily mounted on or applied to a camera casing in a manner permitting ready adjustment, the battery case being readily adaptable to use either two or three cells of flash-light batteries, said battery case having a lamp readily useable as a voltage indicator to ascertain the condition of the batteries at any time, the battery case having means for clamping the same to the camera in an adjustable manner and having means for connecting the battery and lamp circuit to a focal-plane shutter with means for preventing inadvertent flashing of the flash lamp when so connected; means for mounting the reflector on the battery case so that it may be readily adjusted or detached; and a lens system built into the battery case and so positioned as to serve for aligning the reflector with the object to be photographed, this being particularly important with photoflash lamps using reflectors that project a narrow beam of light.

The foregoing and other features of my invention are fully set forth in the following description.

Making reference first to Figs. 1 to 5, the casing of the camera is indicated generally at 20. While the invention may be applied to any desired type of camera, I have chosen to illustrate the same as applied to the well known Graphic type of camera. The synchronizing equipment of my invention can, however, be applied to any type of camera having the usual between-the-lens shutter or the usual focal plane shutter or having both such shutters, in which latter case the operator would determine with which shutter to effect synchronization.

The camera is preferably provided with a detachable lens board 21 carrying a between-the-lens shutter 22 having a lens 23. Attached to the camera casing 20 is a battery-case bracket 24, shown detached in Fig. 7, and the ends whereof are attached to the camera casing by screw 24a, 24a, the shape of the said bracket 24 as herein shown being such that it extends sufficiently about the range finder 25 usually provided on such type of camera. A bracket of different construction may, of course, be used when the camera does not carry a range finder.

The battery case is indicated generally at 26 and is made up of two parts clamped or otherwise removably secured together and supported by a clamp member or ring 27, which is itself secured to the battery bracket 24 by a clamping lever 28. This portion of the structure will be more fully described at a subsequent point.

The battery case 26 is so constructed as to carry a flash lamp or bulb 29. A reflector 30 is also provided for the purpose of concentrating the light of the said flash bulb upon the object to be photographed.

I have indicated generally at 31, Figs. 1 and 3, a magnetic tripper. This is preferably attached to the lens board 21 by means of two or more screws 136a, one screw only being shown. The said magnetic tripper 31 is electrically connected to the battery case 26 by means of a cable 32 and a plug 33, shown in Fig. 1. An operating or release lever 34, which may be of usual construction and which is provided upon the shutter 22, is operated by a shaft or rod 35 provided with a connecting bar 36 for engaging a clevis 37 attached to the shutter operating or release lever 34 by means of a pin 38.

Returning to the structure of the battery case 26, shown in Figs. 1, 2, 5 and 6 to 9 particularly, the case itself is made up of two preferably cylindrical sections 40, 41, the section 40 being the upper and the section 41 being the lower one. For ordinary use, I have provided two dry cells of some well known type of manufacture. At times, however, it is desirable to provide three such cells, and in order to do this, I have provided an additional lower battery-case member or section 42, shown detached in Fig. 2, and which is of sufficient length to accommodate such additional battery cell. I may use together either the upper section 40 and the short lower detachable section 41, in which case there are only two dry cells, or I may use the upper section 40 and the longer lower section 42, in place of the shorter lower section 41, and in such case there is thus provided means for supporting three dry cells.

The camera having the synchronized equipment attached thereto has, as shown in side elevation in Fig. 3, the reflector 30 supported by a reflector bracket 43 attached to the upper battery-case section 40, which serves to support said reflector in such position that it can be readily adjusted along (that is, lengthwise of) the said bracket 43. The reflector 30 is provided with a clamping bracket 44 and a clamp screw 45. When the latter is loosened the reflector 30 can be adjusted up and down along the bracket 43, and thus can be set in proper position with respect to the flash lamp 29 which is held to the battery case 26 by means of a clamping socket having operating arms 46, 46 and jaws 47, 47. An operating button 48 is provided for completing the circuit through the flash-lamp 29 and the magnetic tripper 31 when the front or between-the-lens shutter is provided. When, however, the synchronizer equipment is to be used in cooperation with the rear or focal-plane shutter, which use is shown in Fig. 4, I provide in conjunction therewith a structure which may be such as is disclosed in my Patent No. 2,188,065, dated January 23, 1940, and which therefore need not be more fully described here.

In such use of my present invention, there is provided an operating button 48, indicated also in Fig. 3, which is carried by a flat spring member or arm 49 hinged to a bracket 50 attached to the upper battery-case section 40 by means of rivets 51, 51, the parts being so constructed that the spring member or arm 49 can be turned downward so that the connecting plug 52 can engage the contacts 53, 54, shown in full lines in Fig. 3 and in dotted lines in Fig. 4. Said connecting plug 52 is provided with a cable 55 having a second connecting plug 56 engaging a socket 57 of the focal-plane shutter, itself provided with contact members 58, 59, shown in dotted lines in Fig. 4, and which may be of a character disclosed in said Patent No. 2,188,065.

Figure 5:
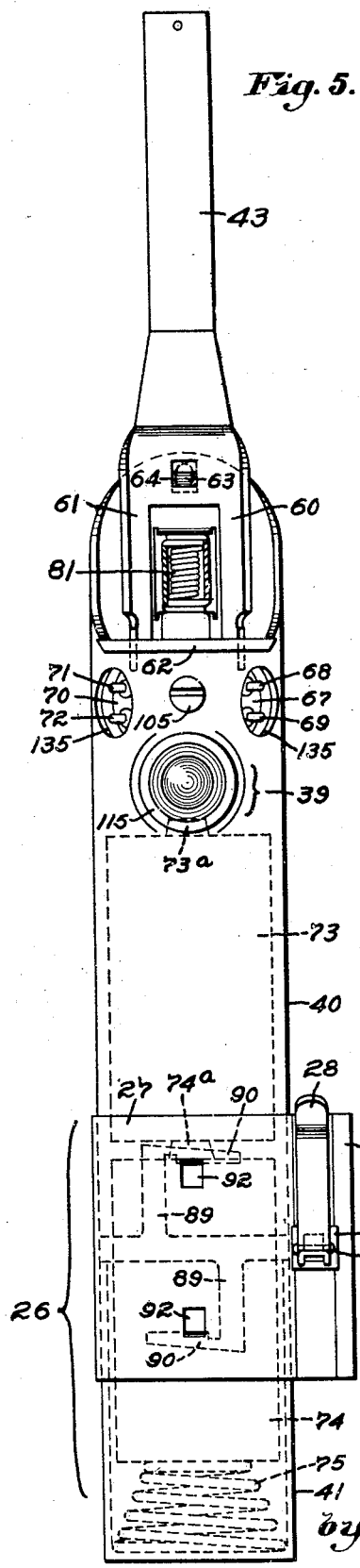
Fig. 5 is a front view in elevation of the battery case removed from the camera, showing the position of the reflector support bracket; the reflector being removed and the batteries being shown in dotted lines.
Figure 10:
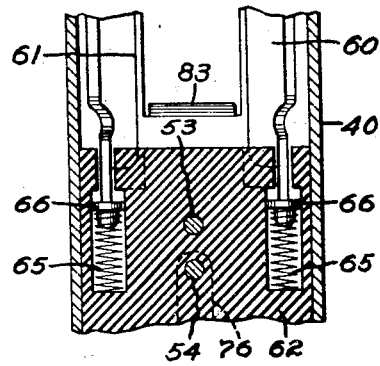
Fig. 10 is a vertical section through a part of the battery case showing the retaining springs for the reflector bracket.

The battery case 26 (but with the reflector removed) is shown in Fig. 5, which indicates how the reflector bracket 43 is attached to the battery case. The said bracket 43 is provided with two legs 60, 61 extending through holes in the battery-case insulating block 62, as shown in Fig. 10. The said bracket 43 is provided with a hooked formation or member 63 which engages a hole 64 in the upper battery-case section 40. In the said insulating block 62 there are provided grooves for receiving small coiled springs 65, 65 engaging spring blocks 66, 66 for the purpose of causing upward pressure upon the said legs 60, 61. This structure is shown also in Fig. 5. In order to remove the bracket 43, it is merely necessary to apply downward pressure on the bracket 43 which will compress the springs 65, 65 sufficiently to allow the hook-like part or member 63 to be disengaged from the hole 64, thus releasing the reflector bracket 43.

As indicated in Fig. 5, the connecting plug 33 has been removed from a socket 67 in the battery case, thereby exposing contact members 68 and 69. A second socket 70 is provided on the left hand side of the said battery case as the same is viewed in Fig. 5. Within said socket are contact members 71 and 72. In Fig. 5, the batteries 73, 74 are indicated in dotted lines. They have positive contact members 73a, 74a respectively, and the lower battery-case section 41 is provided with a spring 75 for maintaining a contact to or with the negative side of the battery cell, said spring also serving to apply upward pressure on the battery cells 73, 74, causing contact to take place between the positive connection 73a (shown in dotted lines in Fig. 5) and the positive contact member 76.

An auxiliary lamp control button is indicated at 77 in Fig. 3. The said button provides for the control of the electric circuit extending to the auxiliary lamp or bulb 39, acting as a pilot lamp pointing in the direction in which the reflector directs the rays from the bulb 29 of the flash lamp.

It has been stated that the battery case 26 is made up of the upper battery-case section 40 and a lower section 41 or 42, depending upon whether two or three dry cells are to be used. Both the upper battery-case section 40 and the lower section 41 are provided as shown in Fig. 8, and as indicated in dotted lines in Fig. 5, with vertical or lengthwise slots 89, 89 and horizontal or transverse slots 90, 90. Each slot 90 is so shaped as to provide a projection 91 extending partly across the same. The battery-case clamp member or ring 27 is provided, as shown in Fig. 6, with hook-engaging formations 92, 92 to engage said slots 90, 90. When the upper battery-case section 40 is engaged by the clamp member or ring 27 by the guiding hook formations 92 in the vertical slots 89, 89 of the upper battery-case section 40 and lower section 41 (or 42), the hook formations 92 are caused to engage the slots 90. This is effected by holding the upper battery-case section 40 in one hand and turning the lower battery-case section 41 (or 42) with the other hand in a clockwise direction, pressure being at the same time applied with such hand in an upward direction on the lower battery-case section 41 (or 42) and with the hand that holds the battery-case section 40 applying downward pressure thereon. This permits the hook formations 92 to pass the respective projections 91 and engage the slots 90. The battery-case sections 40 and 41 (42) tend to spread under the influence of the coil spring 75 that (as shown) presses against the bottom of the battery-case section 41 and against battery 73, battery 74, contact 74a, contact 73 and positive contact strip 76. This pressure will prevent the hook formations 92 from being disengaged from the slots 90 through any action of the projecting lugs 91 of Figs. 2 and 8.

It will be noted that the said slots 90 are somewhat longer than the width of the hook formations 92. This provides for a lateral (that is, circumferential) adjustment of the upper battery-case section 40 with respect to the clamping member or ring 27 for the purpose of aligning the reflector 30 so as properly to direct the light upon the object being photographed. The said clamping member or ring 27 is provided with channel formations 93, 93 for engaging the battery-case supporting bracket 24, as shown in Fig. 9. The said bracket 24 is, as there shown, provided with notches 94, 94 at the junction of the horizontal arm 95 and the vertical member 96 of said bracket. This construction permits the channel formations 93 to engage the vertically positioned member 96 in such a manner that it can be moved along the vertical member 96 and clamped in any desired position thereon.

The clamping member or ring 27 is provided with clamping blocks 98, 98, most clearly shown in Figs. 6 and 9. The right hand clamping block 98, viewing Fig. 9, is provided with a nut 99 engaged by the threaded end of clamping rod 100, provided with a square end 101 having a hinge pin 102 passing through such square end and the clamping lever 28. The latter is provided with a cam shaped formation 103 riding on a plate 104 when the clamping lever 28 is in the position shown in Fig. 6. This causes pressure to be applied to the clamping blocks 98, 98 and to the channel formations 93, 93, thus permitting clamping member or ring 27 to be clamped to the vertical member 96 of the bracket 24, best shown in Fig. 7. Any degree of clamping action can be secured by adjusting the threaded end of the clamping rod 100 in the nut 99 of the right hand clamping block 98, shown in Fig. 9. When the clamping lever 28 is in the position shown in Fig. 6, the upper battery-case section 40 and the lower section 41 will also be clamped in rigid position. When the clamping lever 28 is released, the entire battery case 26 can be moved vertically on the said upright member 96 of the bracket 24, and said entire battery case 26 can also be adjusted in a horizontal direction or circumferentially, so as properly to align the reflector 30 and the flash lamp 29, and so as to project the light from the flash lamp onto the object to be photographed.

An auxiliary lamp is indicated generally at 39 in Figs. 1 and 5. Said auxiliary lamp 39 has a further important function in that it serves as means for checking the condition of the batteries 73 and 74. This is done by merely operating the switch button 77 and noting the color of the light filament. If the color is close to white, the batteries are satisfactory, but as the filament approaches a yellow color, the batteries are weak and should not be used.

The auxiliary lamp 39 not only is used in locating the object to be photographed, but it is used for adjusting the position or angle of the reflector 30, so that the reflector will throw the light in the proper direction for making the desired photograph.

In order to complete the circuit through the photo-flash lamp 29 and the batteries to the operating button 48, which is insulated from the arm 49, there is attached a contact disk 128. As indicated in the circuit diagram Fig. 12, when button 48 is pressed, contact is made between contact member 53, dish 128 and connecting member 54, thus completing a circuit through the lamp contact 79, connector member 53, contact disk 128, connector member 54, and positive contact strip 76 to the battery contact 73a of battery 73, then through said battery to the contact 74a of battery 74, and then through said battery to spring 75, to battery-case sections 41 and 40, through battery socket members 47, flash-lamp base 88 and lamp contact 108, thus completing a circuit through the photo-flash lamp 29 and the batteries.

As shown in Fig. 4, the switch arm 49 and switch base 50, previously described as attached to the battery-case section 40, are respectively provided with two upturned ears extending from the base 50 and having holes, and members 132, 132 on the switch arm 49, thereby providing a pivot for said switch arm. Also formed integral with the base plate 50 is a spring member 133 bearing against a flat portion of the switch arm 49 and tending to cause said switch arm to rock on the pivot formed by the members 132, 132 until contact with a suitable stud stops further movement of said switch arm 49. The construction and operation are such that the contact disk 128 does not normally touch connector members 53 and 54, but a slight pressure on the contact button 48 causes the switch arm 49 to spring sufficiently to cause the said disk 128 to contact with the said connector members 53 and 54.

Referring to Fig. 4, the said switch arm 49 is so constructed that it can be swung downward away from the connector members 53 and 54, so that the focal-plane shutter connector 52 can be attached to the said connectors 53 and 54, thus putting the focal-plane shutter contacts 58, 59 in series with the photo-flash lamp 29, and if contact is made between said contacts 58, 59 a circuit will be completed through contact plug 56, wire 55, connector 52 and contacts 53, 54, thus causing the flash lamp 29 to be ignited. When the magnetic tripper 31 is in use, the switch arm 49 overlies the contacts 53 and 54, thus preventing anyone from connecting any auxiliary device to those contacts, which, if done, would cause the flash-lamp 29 to be flashed inadvertently. To permit the use of additional flash-lamps remote from the battery case, there are provided two additional sets of connectors 68, 69, 71, 72, which are in parallel with the photo-flash lamp base by means previously described.

As shown in Figs. 4 and 5, the connector members 53, 54, 68, 69, 71 and 72 are accessible through holes 135 in the upper battery-case section 40. A lamp can be placed in the lamp socket jaws 47, 47, and additional lamp sockets can be connected to the contacts 68, 69, 71, 72, and upon the completion of a circuit through the connectors 53, 54, all three lamps will be caused to be ignited simultaneously.

If, however, a magnetic tripper is connected to either set of connectors 68, 69 or 71, 72, the magnetic tripper will also be in parallel with the photo-flash lamp 29. I have provided the magnetic tripper 31 to be used with the equipment, thereby making it possible to make photo-flash exposures by any one of the three well-known methods, the first of which is the so-called "open and shut" method, wherein the camera shutter is set at "bulb" exposure, and the shutter is caused to be opened at the same time that contact button 48 is pressed, whereupon the shutter is immediately allowed to close. In this method, however, the exposure time is limited by the duration of the photo-flash lamp. The second method of photo-flash synchronization is carried out by the use of the focal-plane shutter, as disclosed in my Patent No. 2,188,065 above referred to, and in such use the button 48 and switch arm 49 are swung downward out of the way, the focal-plane shutter being connected through connectors 53 and 54. The third method of photo-flash synchronization is carried out through the use of an electro-magnetic tripper for operating the front shutter, which is more particularly described and claimed in my copending application Ser. No. 388,614.

Figure 11:
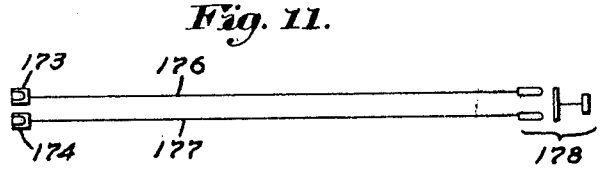
Fig. 11 is a diagram of the wiring as required for remote control.

In Fig. 11 is shown a circuit diagram for use in remote control, by which I mean the operation of the flash synchronizer from a distance. This is done by connecting suitable plugs 173, 174, to connectors 53, 54, and by attaching a wire 176 to the connector plug 173 and attaching a wire 177 to the connector plug 174, said wires 176, 177 being connected to a suitable switch 178. When the switch 178 is operated, a circuit is completed through the connectors 53, 54 in precisely the same manner as if the button 48 had been pressed.

Figure 12:
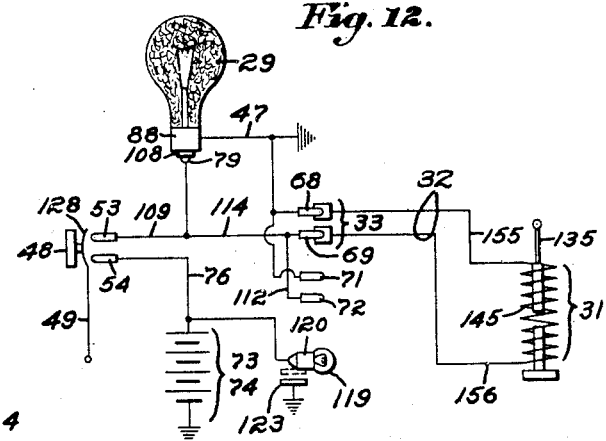
Fig. 12 is a circuit diagram of the flashlight synchronizer equipment, showing the connection for the operation of the front shutter.

The circuit diagram of the flash synchronizer equipment when the magnetic tripper is used on a front or between-the-lens shutter is shown in Fig. 12, from which it appears that the batteries 73 and 74 are connected in series and then to ground, the ground in this instance being the battery case 26 made up, as stated, of the upper section 40 and lower section 41 or 42. To the positive terminal 73a of the battery 73 is connected the strip 76 which is connected to the contact or connector 54. The auxiliary lamp bulb 119 has contact with one side of the positive connector 76, and the base 120 of said lamp bulb 119 has contact with the contact strip 123, as shown in dotted lines in Fig. 12. Connected to the plug 53 is the center contact 79 which makes contact with the lower lamp contact 108. The current then passes through the filament of the flash lamp 29, through the base 88 and socket members 47, 47 to the ground (namely, the battery case 26). The connectors 68 and 71 are also connected to ground and the connector plug 69 is connected to plug 53, connector plug 72 being connected to the plugs 69 and 53. When the magnetic tripper is used, the plug 68 is connected to wire 155 and the current passes through coil 145 to wire 156 and then to connector plug 69. The coil 145, flash lamp 29, and plugs 71, 72 are in parallel, and the plugs 53, 54 are in series with flash lamp 29 and the battery, made up of the cells 73 and 74 in the present instance.

I will now trace through the various combinations of circuits in the operation of the photo-flash equipment herein set forth, according to each of the several uses of such synchronizer equipment.

It will first be assumed that it is desired to make a so-called "open and shut" photo-flash, meaning, as already stated, that the camera shutter is set on the "bulb" position and is in that position when the operating or shutter release lever 34 is pressed, the shutter being open and remaining open until the said lever 34 is released.

In making this type of exposure the battery case is placed on the camera as shown in Figs. 1 and 3. The plug 33 and the cable 32 are not in place, and there is no magnetic tripper attached to the shutter, it having been removed from the lens board, it being removably mounted therein by means of the bracket 136. A flash lamp 29 is placed in the socket jaws 47, 47 and the auxiliary lamp contact 77 is pushed upwardly, thereby causing a beam of light to be projected in the direction of the object to be photographed. The clamp 28 is thrown downward and the battery case 26 is turned sufficiently in the member or ring 27 until the light from the auxiliary lamp 39 falls upon the object it is desired to photograph. The clamping lever 28 is then moved into the position shown in Fig. 1.

Assuming that the reflector 30 has been suitably adjusted in a vertical direction with respect to the flash lamp 29, so that the latter will center in the reflector, the most economical use of the light from said flash lamp is made in taking the photograph. After the suitable adjustment has been made, the contact button 79 is moved downwardly, thus extinguishing the auxiliary lamp-bulb 119, and the operator than aligns his camera in any well known manner such as through the optical view finder. The shutter release or operating lever 34 is then depressed and at the same time the contact button 48 is pressed inwardly and then immediately both buttons are released. The pressure on the shutter release or operating lever 34 will have opened the shutter, and the pressure on the contact knob 48 will have caused the flash lamp 29 to become illuminated and the release of pressure on said release or operating lever 34 will have allowed the shutter to close. No further pressure will be required on the contact knob 48, since when the flash lamp 29 is ignited its circuit is thereby opened.

When making a flash exposure with the use of the focal-plane shutter, the contact lever 49 is folded downwardly as indicated in Fig. 4, and the connector plug 52 is connected to contacts 53 and 54. The said plug 52 is attached to a cable 55 having on its opposite end a plug 56 engaged with the focal plane synchronizing socket 57 connected with the contacts 58 and 59 of the camera back. The flash lamp 29 is inserted in the socket members 47, 47 and the bulb 119 of the auxiliary lamp 39 is illuminated by manipulation of the switch 77 and the reflector 30 is properly aligned from the object to be photographed. The front shutter is set on "time" in the open condition and the back shutter is ready to make an exposure upon releasing the focal-plane-shutter release lever (not here shown). The structure of such focal-plane shutter and the synchronizing mechanism therefor are fully disclosed in my said Patent No. 2,188,065. When the shutter is released, the curtain travels downwardly and at a predetermined point, the contacts 58 and 59 are bridged or connected together by a metallic tab or element on the shutter curtain.

Referring to Fig. 12, inasmuch as the connector 53 is connected with the contact 58 and the connector 54 is connected with the contact finger 59, a circuit will have been closed between them, thus allowing current to flow from the batteries 73, 74, through the positive contact strip 76, connector 54, cable 55, contacts 58 and 59, connector 53, to the lamp contact button 79, lamp contact 108, through the filament of the flash lamp 29, to base 88, to the socket members 47, to ground, which is the battery case, and from ground to the opposite side of the battery, thus completing the circuit through the photo-flash lamp 29 and causing it to become ignited.

When it is desired to make a photo-flash exposure using the front or between-the-lens shutter, a flash-lamp 29 is inserted in the socket jaws 47, 47, and the connector plug 33 is connected to socket 67, thus connecting the magnetic tripper 31 to the electrical circuit of battery case 26. The said battery case is positioned in the manner previously described, so as to ensure the most efficient use of the light from the flash-lamp 29. The focal-plane shutter is set in the "open" position. The between-the-lens shutter is set for whatever speed it is desired to use. The shutter is then cocked by moving the lever 173 from the position shown in dotted lines in Fig. 1 to the position shown in solid lines therein, the release or operating lever 34 having been previously connected to the magnetic tripper 31 by means of the clevis 37, bar 36 and shaft 35, as previously described.

The release or operating lever 34 will now be depressed part way but not sufficiently far to trip the shutter. The contact bar 49 and the button 48 will be in the position shown in Fig. 3, and pressure on the button 48 will close the contacts 53 and 54. Current will then flow from batteries 73, 74 through positive contact strip 76, connector 54, contact disk 128, connector 53, contact spring 109, connector button 79, contact 108 through the filament of flash-lamp 29, to base 88 and socket jaws 47, 47 and thence to ground, completing the circuit through the flash lamp 29. The connector 68 is also connected to ground and connector 69 is connected to spring 114, which contacts with the sleeve 106 of the connector button 79. Inasmuch as the connector button 79 has its circuit as previously described, current will also flow through the magnetic tripper winding 145 and through cable 32, which is made up of wires 155, 156. The shaft or rod 35 of magnetic tripper 31 will be caused to move downwardly through its connection with the movable armature or solenoid plunger 161. The release or operating lever 34 will then be moved downward, thus releasing the shutter, flashing tthe lamp 29 and causing an exposure to be made.

It will be understood from the foregoing description that I have provided a photo-flash synchronizing equipment having a great many advantages and improvements over existing synchronizer equipments known to me.

Having thus described one embodiment, with several indicated uses, of the invention, it is to be understood that although specific terms are employed, they are used in a generic and descriptive sense and not for purposes of limitation, the scope of the invention being set forth in the following claims.

I claim:

1. In a photographic flash synchronizer equipment for use with a camera having a casing, and having either or both a between-the-lens shutter and a focal-plane shutter, the following combination of parts, viz: a battery case having battery means and having means to support a flash-lamp; means for attaching said battery case to the camera casing; circuiting means operatively connecting the battery to the flash-lamp; said battery case including a clamp member or ring with means for attaching the same to the camera casing; a main battery-case section and a supplemental section each carrying a portion of the battery means, each of said sections and the said clamp member or ring having formations for respectively effecting the detachable connection of said respective sections separately to said clamp member or ring, so that either of said sections may be removed from the member or ring when supported thereby, without disturbing the other section in use, thus permitting if desired the ready removal of the supplemental section or substiution of another supplemental section.

2. In a photographic flash synchronizer equipment for use with a camera having a casing, and having a shutter, the following combination of parts, viz: a battery case having battery means and having means to support a flash-lamp; means for attaching said battery case to the camera casing; circuiting means operatively connecting the battery to the flash-lamp; said battery case consisting of a main case section and a pair of interchangeable supplemental sections differing in battery-carrying capacity, and a clamp member or ring attachable to the camera casing, each of said sections and the said clamp member or ring having formations for respectively effecting the detachable connection of said respective sections separately to said clamp member or ring, so that either of said sections may be removed from the member or ring when supported thereby, without disturbing the other section in use, thus permitting if desired the ready removal of the supplemental section or substitution of another supplemental section.

3. In a photographic flash synchronizer equipment for use with a camera having a casing, and having either or both a between-the-lens shutter and a focal-plane shutter, the following combination of parts, viz: a battery case having battery means and having means to support a flash-lamp; means for attaching said battery case to the camera casing; circuiting means operatively connecting the battery to the flash-lamp; said battery case consisting of two sections and a clamp member or ring having means for attaching the same to the camera casing, each of the said battery case sections and said clamping member or ring having interengageable slots and projections for respectively effecting the detachable connection of said respective sections separately to said clamp member or ring, so that either of said sections may be removed from the member or ring when supported thereby, without disturbing the other section in use, thus permitting if desired the ready removal of the supplemental section or substitution of another supplemental section.

4. In a photographic flash synchronizer equipment for use with a camera provided with a casing having a lens and one or more shutters; a battery case-receiving bracket attached to the camera casing and adapted to receive a battery case, flash lamp and a reflector; a battery case-carrying ring-like member; a battery case having two lengthwise alignable members each having means pertaining only to it and to said ring-like member for removably supporting each member so that they are in alignment in said ring-like member and together receiving a plurality of connected batteries; so that either of said sections may be removed from the member or ring when supported thereby, without disturbing the other section in use, thus permitting if desired the ready removal of the supplemental section or substitution of another supplemental section; and means for securing said ring-like member to the camera-casing bracket with capacity for adjustment in a direction lengthwise of the said battery case-receiving bracket, at any point throughout a substantial range of such lengthwise movement.

5. In a photographic flash synchronizer equipment for use with a camera provided with a casing having a lens and one or more shutters; a battery case-receiving bracket attached to the camera casing and adapted to receive a battery case, flash lamp and a reflector; a battery case-carrying ring-like member; a battery case having two lengthwise alignable members each having means pertaining only to it and to said ring-like member for removably supporting each member so that they are in alignment in said ring-like members and together receiving a plurality of connected batteries; so that either of said sections may be removed from the member or ring when supported thereby, without disturbing the other section in use, thus permitting if desired the ready removal of the supplemental section or substitution of another supplemental section; and means for securing said ring-like member to the camera-casing bracket with capacity for adjustment in a direction lengthwise of the said battery case-receiving bracket, said securing means including interengaging supporting formations upon said ring-like member and said casing bracket, slidable relatively upon each other, and means to clamp said ring-like member in any desired position of adjustment into which it is so slid.

6. In a photographic flash synchronizer equipment for use with a camera provided with a casing having a lens and one or more shutters; a battery case-receiving bracket attached to the camera casing and adapted to receive a battery case, flash lamp and a reflector; a battery case-carrying ring-like member; a battery case having two lengthwise alignable members each having means pertaining only to it and to said ring-like member for removably supporting each member so that they are in alignment in said ring-like member and together receiving a plurality of connected batteries; so that either of said sections may be removed from the member or ring when supported thereby, without disturbing the other section in use, thus permitting if desired the ready removal of the supplemental section or substitution of another supplemental section; and means for securing said ring-like member to the camera-casing bracket with capacity for adjustment in a direction lengthwise of the said battery case-receiving bracket, said means including lengthwise-extending, spaced, channel formations upon the said ring-like member, the camera-casing bracket having a part whereof the longitudinal edges are slidably received in said channel formations, and means to tighten said channel formations upon said longitudinal edges of said bracket in any desired portion of adjustment.

7. In a photographic flash synchronizer equipment for use with a camera provided with a casing having a lens and one or more shutters; a battery case-receiving bracket attached to the camera casing and adapted to receive a battery case, flash lamp and a reflector; a battery case-carrying ring-like member; a battery case having two lengthwise alignable members each having means pertaining only to it and to said ring-like member for removably supporting each member so that they are in alignment in said ring-like member and together receiving a plurality of connected batteries; so that either of said sections may be removed from the member or ring when supported thereby, without disturbing the other section in use, thus permitting if desired the ready removal of the supplemental section or substitution of another supplemental section; and means for securing said ring-like member to the camera-casing bracket with capacity for adjustment in a direction lengthwise of the said battery case-receiving bracket; said means including two lengthwise-extending, spaced channel formations upon said ring-like member, the said camera-casing bracket having a part whereof the longitudinal edges are slidably recessed in said channel formations, and a clamping lever carried by said ring-like member to hold the said ring-like member in the desired position of adjustment.

8. In a photographic flash synchronizer equipment for use with a camera provided with a casing having a lens and one or more shutters; a battery case-receiving bracket attached to the camera casing and adapted to receive a battery case, flash lamp and a reflector; a battery case-carrying ring-like member; a battery case having two lengthwise alignable members each having means pertaining only to it and to said ring-like member for removably supporting each member so that they are in alignment in said ring-like member and together receiving a plurality of connected batteries; so that either of said sections may be removed from the member or ring when supported thereby, without disturbing the other section in use, thus permitting if desired the ready removal of the supplemental section or substitution of another supplemental section; and means for securing said ring-like member to to the camera-casing bracket with capacity for adjustment in a direction lengthwise of the said battery case-receiving bracket; said means including two lengthwise-extending, spaced channel formations upon said ring-like member, the said camera-casing bracket having a part whereof the longitudinal edges are slidably recessed in said channel formations, a clamping lever carried by said ring-like member to hold the said ring-like member in the desired position of adjustment, and means for varying the clamping capacity of said clamping lever.

9. In a photographic flash synchronizer equipment for use with a camera provided with a casing having a lens and one or more shutters; a battery case-receiving bracket attached to the camera casing and adapted to receive a battery case, flash lamp and a reflector; a battery case-carrying ring-like member; a battery case having two lengthwise alignable members each having means for removably supporting them in such alignment in said ring-like member and together receiving a plurality of connected batteries; and means permitting a turning movement of circumferential adjustment of both of said battery-case members in said ring-like member; said means permitting such turning movement consisting of circumferentially-extending slots in the walls of said battery-case members, and holding formations projecting from the wall of said ring-like member and receivable in said slots for supporting the battery case members when the parts are so engaged.

10. In a photographic flash synchronizer equipment for use with a camera provided with a casing having a lens and one or more shutters; a battery case-receiving bracket attached to the camera casing and adapted to receive a battery case, flash lamp and a reflector; a battery case-carrying ring-like member; a battery case having two lengthwise alignable members each having means for removably supporting them in such alignment in said ring-like member and together receiving a plurality of connected batteries; and means permitting a turning movement of circumferential adjustment of both of said battery-case members in said ring-like member; said battery case having mounted therein an auxiliary or pilot lamp in circuit with said batteries and pointing in such direction that its rays fall upon the object to be photographed if and when the said circumferential adjustment is correct, so that the reflector directs the rays from the flash-lamp onto such object.

11. In a photographic flash synchronizer equipment for use with a camera provided with a casing having a lens and one or more shutters; a battery case-supporting bracket attached to the camera casing and adapted to support a battery case, flash lamp and a reflector; a battery case-carrying ring-like member; a battery case supported in said ring-like member and receiving a plurality of connected batteries; a supporting bracket 43 for said reflector, said bracket having members 60, 61 and the battery case having within the upper end of the same an insulating block 62 to receive said members 60, 61, there being interengaging formations of said bracket members and the insulating block of said battery case permitting ready detachment of said bracket 43 from the battery case, and means for securing said ring-like member to the camera-carried bracket.

12. In a photographic flash synchronizer equipment for use with a camera provided with a casing having a lens and one or more shutters; a battery case-supporting backet attached to the camera casing and adapted to support a battery case, flash lamp and a reflector; a battery case-carrying ring-like member attached to said bracket; a battery case having two lengthwise alignable members each having means distinct from the other member for removably supporting them in such alignment in said ring-like member and together receiving a plurality of connected batteries, and said ring-like member having formations for respectively and separately detachably engaging the said means of said two lengthwise alignable members, so that either of said lengthwise alignable members may be removed from the ring-like member when supported therein, without disturbing the other of said alignable members, thus permitting, if desired, the ready removal of one of said alignable members or the substitution therefor of another alignable member; and means permitting a turning movement of circumferential adjustment of both of said battery-case members in said ring-like member.

OSCAR STEINER.